United States Patent [19]

Okamoto et al.

[11] Patent Number: 4,981,337
[45] Date of Patent: Jan. 1, 1991

[54] FIBRE-TYPE LIGHT WAVELENGTH COVERSION DEVICE

[75] Inventors: Sota Okamoto; Kiyofumi Chikuma, both of Saitama, Japan

[73] Assignee: Pioneer Electronic Corporation, Tokyo, Japan

[21] Appl. No.: 354,996

[22] Filed: May 22, 1989

[30] Foreign Application Priority Data

Oct. 27, 1988 [JP] Japan ................. 63-271537

[51] Int. Cl.$^5$ ............ G02B 6/22; G02F 1/35
[52] U.S. Cl. ............... 350/96.29; 350/96.15; 350/96.33; 307/425; 307/430
[58] Field of Search ............ 350/96.15, 96.16, 96.2, 350/96.29, 96.3, 96.33, 96.34, 353, 354; 307/425–430

[56] References Cited

U.S. PATENT DOCUMENTS

| 4,830,447 | 5/1989 | Kamiyama et al. | 350/96.15 |
| 4,838,638 | 6/1989 | Kamiyama et al. | 350/96.15 |
| 4,874,221 | 10/1989 | Ohsawa | 350/96.33 |
| 4,892,375 | 1/1990 | Chikuma et al. | 350/96.29 |
| 4,893,888 | 1/1990 | Okazaki et al. | 307/425 |

FOREIGN PATENT DOCUMENTS 61-50122  3/1986  Japan .

Primary Examiner—John D. Lee
Assistant Examiner—John Ngo
Attorney, Agent, or Firm—Fleit, Jacobson, Cohn, Price, Holman & Stern

[57] ABSTRACT

A fibre-type light wavelength conversion device for converting the wavelength of an incident light beam and issuing the incident light beam as a light beam having a predetermined wavelength, having a core and a cladding layer around the core. The device is characterized by the provision of a transparent cylindrical layer provided around the cladding layer, having a refractive index substantially equal to the refractive index of the cladding layer and having a predetermined wall thickness. According to a feature of the invention the wall thickness is determined so that the condition $d > 1 \tan \theta$ is satisfied, where d represents a diameter of said cylindrical layer, l represents an operating length of the device, and $\theta$ represents Cerenkov angle.

4 Claims, 1 Drawing Sheet

LIGHT SECOND HARMONIC WAVE RING

FIBRE-TYPE LIGHT WAVELENGTH COVERSION DEVICE

BACKGROUND OF THE INVENTION

1. Field of the Invention

The present invention relates to a fibre-type light wavelength conversion device.

2. Description of Background Information

An optical pickup is known by which high density writing and reading of information on and from a disc are enabled by transforming the wave length of a laser beam emitted from a laser source to a half the original wave length by means of a light wavelength conversion device (Japanese Patent Application Laid-Open No. P61-50122).

As the light wavelength conversion device for use in this pickup, there is an optical fibre type SHG (Second Harmonics Generator) using a second-order non-linear optical effect. A phase matching of Cerenkov radiation system is adopted in the optical fibre type SHG. With this system, it is possible to generate a second harmonic wave whose phase matching is attained almost automatically. The general conception of this device is shown in FIGS. 1A and 1C.

In FIG. 1A, when the fundamental wave mode is propagated through the core with the effective reflective index of $N(\omega)$, the non-linear polarizing wave generating the SH wave is also propagated at the same phase velocity $C/N(\omega)$ (C is the speed of light). It is assumed that this non-linear polarizing wave produces the SH wave in a direction making an angle $\theta$ with respect to the direction of the wave guide at a point A, and generates the SH wave in the direction of $\theta$ as before at a point B, after the elapse of a unit time. If the SH wave generated at the point A propagates through the clad and reaches to a point C after the elapse of a unit time and the angle $\theta$ is such an angle that lines AC and BC are perpendicular to each other, then the plane of the SH wave which was generated from the non-linear polarized wave between A and B becomes equal to BC, and as a result, a coherent SH wave is generated.

The condition of the phase matching is, according to the figure, as follows:

$$N(\omega) = N_{clad}(2\omega) \cos\theta \tag{1}$$

In other words, $$N(\omega) < N_{clad}(2107) \tag{2}$$

This means that the SH is generated automatically in the direction where the phase matching is performed when at least the condition mentioned by the equation (2) is satisfied. Generally, with the refractive indices of the clad and core with respect to the fundamental wave being $n_{clad}(\omega)$ and $n(\omega)$, and with the air as the overlayer, the condition for the fundamental wave to propagate through the core as the mode is expressed as:

$$N_{clad}(\omega) < N(\omega) < n(\omega) \tag{3}$$

Wavelength dispersion of the clad's refractive index will now be considered. Since $n_{clad}(\omega) < n_{clad}(2\omega)$, if the equation (2) is satisfied for all of the fundamental wave modes without regard to the diameter of the core so far as the following expression (4) is satisfied.

$$N_{clad}(\omega) < N(\omega) < n_{clad}(2\omega) \tag{4}$$

Moreover, there are fundamental modes satisfying the equation (2) in a certain range of the diameter of core even under the following condition.

$$N_{clad}(\omega) < n_{clad}(2\omega) < n(\omega)$$

The second harmonic wave generated in this way is propagated in a clad mode as illustrated in FIG. 1B in which total reflection occurs repeatedly at the boundary between the clad and air. Then, the second harmonic wave is emitted in conical shape from the end of fibre in directions making an angle $\theta$ relative to the fibre's direction. The equiphase front of the second harmonic wave emitted in this way is in a conical surface with an axis on the central axis of the fibre.

In this fibre-type light wavelength conversion device, the generated SH wave is guided through the cladding layer reflecting at the boundary plane between the cladding layer and the air. It follows that inversion of phase is generated by the reflection at the boundary surface, and this will result in an interference with the newly generated SH wave. In order to prevent this, it is necessary to determine the operating length of the device, that is, the length l of the fibre so that it satisfies the following condition:

$$l < d_o / \tan\theta$$

where $d_o$ represents the outside diameter of the cladding layer, and $\theta$ represents the angle of radiation of the SH wave, that is, the Cerenkov angle.

Since there is a relationship such that the conversion efficiency of SHG is proportional to l, it is only necessary to enlarge the outside diameter $d_o$ of the cladding layer, in order to increase the length l of the fibre. However, since the fibre-type SHG is manufactured through a process of drawing a tubular material of the cladding layer, it is difficult to enlarge the outside diameter $d_o$ of the cladding layer. Furthermore, if it is attempted to enlarge the outside diameter of the cladding layer, it also results in an increase the diameter of the core part which must generally be in the order of several μ meters. As a result, the power density of the fundamental wave becomes small, to lower the efficiency of the SHG conversion.

OBJECT AND SUMMARY OF THE INVENTION

An object of the present invention is therefore to provide a fibre-type light wavelength conversion device in which the functional length of the device can be determined to be long enough while the diameter value of the cladding layer under the state of art is maintained.

A fibre-type light wavelength conversion device according to the present invention has a construction in which a transparent cylindrical layer having a refractive index substantially equal to that of the cladding layer and having a predetermined wall thickness is provided around the cladding layer.

DETAILED DESCRIPTION OF THE PREFERRED EMBODIMENT

The embodiment of the present invention will be explained in detail hereinafter with reference to FIG. 2 of the accompanying drawings.

Figure 1A:
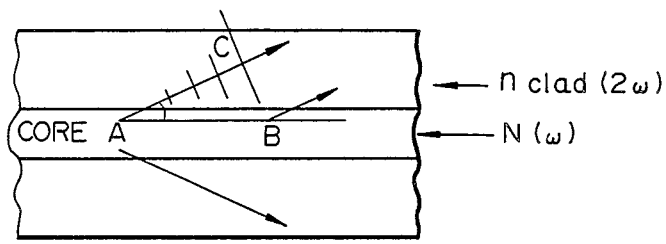
FIGS. 1A and 1B are diagrams showing the concept of the Cerenkov radiation system phase-matching SHG.
Figure 1B:
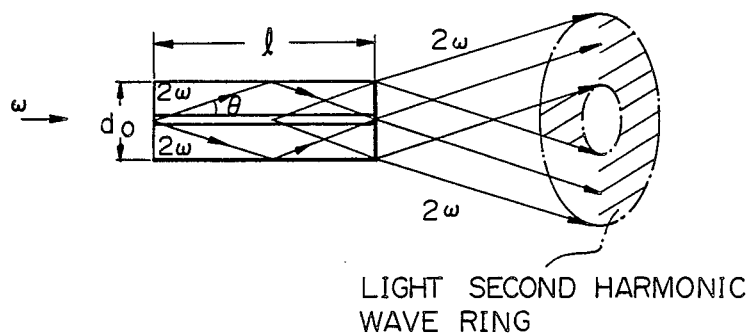
Figure 2:
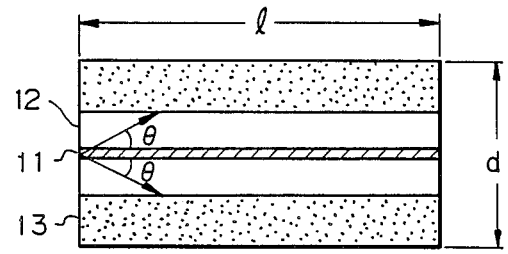
FIG. 2 is a cross-sectional view of an embodiment of the present invention.

In FIG. 2, a fibre-type light wavelength conversion device according to the present invention which is generally denoted by 10 is comprised of a core 11, a cladding layer 12 provided around the core 11, and a transparent cylindrical layer 13 having a refraction index which is substantially equal to that of the cladding layer 12 provided around the cladding layer 12. The cylindrical layer 13 is made from a resin such as acrylic resin, and formed to have a predetermined wall thickness. The wall thickness of the cylindrical layer 13 is selected so that the following condition is satisfied:

$$d > l \tan \theta$$

where d represents the diameter of the cylindrical layer 13, l represents the operating length of the device, that is the length of the fibre, and $\theta$ represents the Cerenkov angle.

By adopting a structure in which the transparent cylindrical layer 13 having a refractive index substantially equal to the refractive index of the cladding layer 12 is provided around the cladding layer 12 as described above, a fibre-type SHG having a thin core portion and a relatively thick cladding portion can be readily produced owing to its ease of manufacture. As a result, it is enabled to increase the operating length of the SHG considerably. With this structure, even if the SH wave is inverted in phase when it is reflected at the boundary between the cylindrical layer 13 and air, the condition $l < d/\tan \theta$ is still satisfied. Therefore, the interference with the newly generated SH wave is surely prevented.

As explained in the foregoing, the fibre-type light wavelength conversion device according to the present invention is constructed such that a transparent cylindrical layer having a refractive index which is substantially equal to that of the cladding layer is provided around the cladding layer. Thus, it is enabled to lengthen the operating length of the device while the diameter of the core portion in the present state of the art is maintained.

What is claimed is:

1. A fibre-type light wavelength conversion device for converting the wavelength of an incident light beam and issuing the incident light beam as a light beam having a predetermined wavelength, comprising:
   a core;
   a cladding layer provided around said core; and
   a transparent layer provided around said cladding layer, said transparent layer having a refractive index substantially equal to a refractive index of said cladding layer and having a constant predetermined wall thickness.

2. A device as set forth in claim 1, wherein said wall thickness is determined to satisfy the following condition of:

$$d > l \tan \theta$$

where d represents a diameter of said cylindrical layer, l represents an operating length of the device, and $\theta$ represents Cerenkov angle.

3. A device as set forth in claim 1, wherein said layer is made of a resin.

4. A fibre-type light wavelength conversion device for converting the wavelength of an incident light beam and issuing the incident light beam as a light beam having a predetermined wavelength, comprising:
   a core,
   a cladding layer provided around said core, and
   a transparent cylindrical layer provided around said cladding layer, said cylindrical layer having a refractive index substantially equal to a refractive index of said cladding layer and having a predetermined wall thickness satisfying the following condition of:

$$d > l \tan \theta$$

where d represents a diameter of said cylindrical layer, l represents an operating length of the device, and $\theta$ represents Cerenkov angle.

* * * * *